3,037,018
PROCESS FOR PREPARING ALLYLATED
DIALDEHYDE STARCH
Lewis A. Gugliemelli, Pekin, and Gary L. Mayer and Charles R. Russell, Peoria, Ill., assignors to the United States of America as represented by the Secretary of Agriculture
No Drawing. Filed Feb. 20, 1961, Ser. No. 90,606
3 Claims. (Cl. 260—233.3)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

The present invention relates to an improved process for preparing highly allylated dialdehyde starch over that taught in applicants' copending application S.N. 8,199, filed February 11, 1960, of which the instant application is a continuation-in-part. As stated in said application, the highly allylated dialdehyde starch is useful as superior substitutes for shellac on wood, glass, and metal surfaces, and for imparting a glossy waterproof finish to paper. The products are also effective adhesives and unusually strong bonding agents for laminations of all kinds.

In the said copending application it is taught that the allyl acetal of substantially fully periodate-oxidized (dialdehyde) starch may be prepared by pretreating previously dried dialdehyde starch with a 1 percent solution of mineral acid in methanol and then reacting the pretreated dialdehyde starch at about 40° C. in one or more stages with allyl alcohol in the presence of dioxane and mineral acid catalyst to obtain allylated dialdehyde starch having an allyl D.S. of 1.8 and practically no residual free aldehyde groups.

The parent application further teaches that the said allylated dialdehyde starch is soluble in a wide variety of organic solvents including dioxane, methyl Cellosolve, acetone, methyl ethyl ketone, ethyl acetate, and pyridine and the solutions of allylated dialdehyde starch in these solvents will heat-cure to hard, clear, protective coatings that are resistant to water, moderately strong acids, salts in solution, and organic solvents such as acetone, dioxane, carbon tetrachloride, benzene, heptane, and ethyl alcohol. As shown in Example 2 of the said copending application, much better water resistance properties were obtained when the product was prepared in a two-stage reaction involving transfer of the partially allylated dialdehyde starch from a water-diluted equilibrium solution to fresh solution and continuing the reaction.

Although it was appreciated in the parent invention that the formation of water of reaction undoubtedly was responsible for the abortively early development of an equilibrium reaction, no obvious water-removing means such as azeotropic distillation or the addition of desiccants such as anhydrous calcium chloride or sodium sulfate proved practicable or effective, and the more cumbersome two-stage reaction of the said copending application was therefore employed.

Inasmuch as the said two-step process disadvantageously necessitates isolating an intermediate for a subsequent reaction and involves added labor, chemical, and equipment costs as well as greater losses, the principal object of the present invention is a simplified one-step process for preparing highly allylated acetals of dialdehyde starch. A further object is a process having a greatly reduced reaction time, which is lowered from previous values of between 9 and 22 hours to a mere 3 to 4 hours. Still another object of the instant invention is the preparation of an improved allylated dialdehyde starch, films of which resist boiling water for 10 hours and are in several respects superior to films prepared from the allylated dialdehyde starch of the parent application. The improved properties of the instantly prepared allylated dialdehyde starch are attributed to reduced degradation incidental to the greatly shortened reaction time and to a lower residual aldehyde content of the product.

We have now discovered that the foregoing acetalization of dialdehyde starch with allyl alcohol at about 40° C. in the presence of a small amount of mineral acid catalyst is greatly facilitated and is rapidly driven to completion by including in the reaction mixture a certain type of ketal such as 2,2-dimethoxypropane and 2,2-diallyloxypropane, the first named of which appears to act as a water-binding or transfer agent and the second of which also acts as an allyl donator, these agents apparently owing their functionality also to the fact that they react more readily with byproduct water than do the acetals of dialdehyde starch.

Although we do not intend to be bound to the following explanation, we believe the following to represent the actual course of the reaction: (1) dialdehyde starch (DAS) reacts with allyl alcohol to form the allyl acetal of DAS plus $H_2O$; (2) 2,2-diallyloxypropane+$H_2O$ forms allyl alcohol plus acetone; (3) the additional allyl alcohol and the utilization of water prevent the development of an equilibrium and thereby drive the first reaction to completion. The compound 2,2-dimethoxypropane prepared by the method of Lorette et al., Jour. Org. Chem. 24: 1731 (1959), is available commercially, and its allyl analogue was prepared in known manner by reacting commercial 2,2-dimethoxypropane with allyl alcohol in the presence of a small amount of acid.

The following specific examples are presented to illustrate the practice of our invention.

*Example 1*

One hundred grams of dialdehyde starch (equivalent to 1.16 moles of aldehyde) that had been dried to a 1.5 percent-moisture level by heating in a force-draft oven for 1 hour at 100° C. and which contained 93 percent dialdehyde units was placed in a 1-liter round-bottomed flask which in turn was placed in a water bath that was thermostated at 40° C. To the flask was then added 100 ml. of absolute methyl alcohol. The mixture was stirred and in a matter of several minutes all the methyl alcohol was absorbed, swelling the dialdehyde starch and forming a solid appearing mixture. At this time, 310 ml. (4.55 moles) of allyl alcohol was added to the flask along with a sufficient amount of 20 percent dioxane hydrogen chloride solution to make the reaction mixture ½ percent with respect to hydrogen chloride. After the mixture was stirred from 10 to 15 minutes, 170 grams (1.63 moles) of 2,2-dimethoxypropane was added and the reaction allowed to continue for a total of 3 hours at which time the mixture had become a viscous, light amber-colored solution. A small amount of insoluble material was removed by centrifugation. The supernatant was poured slowly into 2 liters of cold water with constant stirring and a white insoluble product precipitated which was subsequently filtered with the aid of suction. The product was then suspended in water, beaten in a Waring Blendor and refiltered. This was repeated until the wash water was neutral to litmus paper. The product was air-dried overnight to a dry powder and finally desiccated to 1- to 2-percent moisture in vacuum over phosphorus pentoxide. The yield on a dry basis was 110 grams. *Analysis.*—C, 50.47%; H, 7.01%; allyloxy, 23.6% (Wijs method); methoxy, 13.4% (by difference); moles CHO per gram, 0.002. A 20-percent dioxane solution of the product was prepared and films formed on test tubes by dipping were heat cured at 150° C. for 1 hour. Other solvents such as acetone, methyl Cellosolve, methyl ethyl vents. The heat-cured films, by virtue of cross-linking by the unsaturated allyl groups, were insoluble in organic solvents and were resistant to boiling water for 1 hour. The inherent viscosity (½-percent solution) of the product in pyridine at 25° C. was 0.177.

*Example 2*

One hundred grams (1.16 moles CHO) of 93-percent dialdehyde starch was dried in the manner described in Example 1 and reacted in a similar apparatus with 100 ml. of methyl alcohol at 40° C. To the flask was added 210 ml. (3.10 moles) of allyl alcohol along with a sufficient amount of 20-percent dioxane hydrogen chloride solution to make the reaction mixture ½ percent with respect to the hydrogen chloride catalyst. After 10 to 16 minutes of stirring, 200 grams (1.28 moles) of 2,2-diallyloxypropane was added along with a sufficient amount of hydrogen chloride to maintain the catalyst concentration at ½ percent. Reaction was continued for a total of 4 hours. The product was isolated and dried according to the procedure previously described in Example 1. A dry weight yield of 130 grams was achieved. *Analysis.*—C, 52.50%; H, 7.40%; allyloxy (Wijs method), 45%; methoxy (by difference), 3%; moles of aldehyde per gram, 0.0001 (borohydride method). The inherent viscosity (½-percent solution) in pyridine at 25° C. was 0.132. The solubility properties of this material was the same as those described for the product of Example 1. Films made from solutions of this product, cured at 150° C. for 1 hour were found to be resistant to boiling water for a period of 10 hours. They also showed no visible change after continuous immersion in 4-percent sulfuric acid, acetone, and 50-percent ethyl alcohol at room temperature for a period of 30 days.

*Example 3*

A procedure similar to the one described in Example 2 was carried out on 100 grams of 93-percent dialdehyde starch (1.5 percent moisture); however, only 105 ml. (1.54 moles) of allyl alcohol was used in the reaction along with 200 grams (1.28 moles) of 2,2-diallyloxypropane, at ½-percent hydrogen chloride catalyst concentration. The reaction time was 4 hours, the temperature 40° C. and the product was isolated in the manner previously described. *Analysis.*—C, 51.20%; H, 7.20%; allyloxy, 33.7%; methoxy, 8%; moles CHO per gram 0.0001. The inherent viscosity (½-percent solution) in pyridine at 25° C. was 0.255. Cured coatings of this product were found to resist boiling water for a period of 7 hours.

*Example 4*

A reaction similar to the one in Example 1 was carried out except that the reaction temperature was 25° C. and the reaction time 22 hours. The physical and chemical properties of the resulting product and the product of Example 1 were quite similar.

*Example 5*

A reaction similar to the one described in Example 2 was carried out with the exception that the temperature was 25° C. and the reaction time was 12 hours. The physical and chemical properties of the resulting product and the product of Example 2 were quite similar.

Having disclosed our invention, we claim:

1. An improved process for preparing the allyl acetal of periodate-oxidized dialdehyde starch, at least 93 percent of the original dialdehyde starch being in the dialdehyde form, said process comprising the steps of gelatinizing the said dialdehyde starch with about a 1 percent solution of a strong mineral acid in an organic solvent selected from the group consisting of methanol and dioxane, reacting the gelatinized dialdehyde starch with allyl alcohol at a temperature of not above about 40° C. for about 3 hours in the presence of at least about one molar equivalent of a ketal selected from the group consisting of 2,2-diallyloxypropane and 2,2-dimethoxypropane in the further presence of about 1 percent hydrogen chloride based on the total liquid and pouring the reacted solution into cold water to precipitate the allyl acetal of dialdehyde starch therefrom.

2. The process of claim 1 wherein the ketal is 2,2-diallyloxypropane.

3. The process of claim 1 wherein the ketal is 2,2-dimethoxypropane.

References Cited in the file of this patent

Goldstein et al.: "Chemistry and Industry," January 11, 1958, pages 40–42, 260–233.3.

UNITED STATES PATENT OFFICE
CERTIFICATE OF CORRECTION

Patent No. 3,037,018                          May 29, 1962

Lewis A. Gugliemelli et al.

It is hereby certified that error appears in the above numbered patent requiring correction and that the said Letters Patent should read as corrected below.

Column 3, line 1, after "ethyl" insert -- ketone, and pyridine were also found to be suitable solvents. --; same column 3, line 2, strike out "vents.".

Signed and sealed this 11th day of September 1962.

(SEAL)
Attest:

ERNEST W. SWIDER
Attesting Officer

DAVID L. LADD
Commissioner of Patents